Oct. 6, 1964

S. KIMMEL ETAL 3,151,641

EASILY STORAGED CUTTING-GUIDE TABLE

Filed July 6, 1960

INVENTORS
STANLEY KIMMEL
MILTON L. TEPPER

BY

ATTORNEY

Oct. 6, 1964    S. KIMMEL ETAL    3,151,641
EASILY STORAGED CUTTING-GUIDE TABLE
Filed July 6, 1960    2 Sheets-Sheet 2

INVENTORS
STANLEY KIMMEL
MILTON L. TEPPER
BY
ATTORNEY

United States Patent Office 3,151,641
Patented Oct. 6, 1964

3,151,641
EASILY STORAGED CUTTING-GUIDE TABLE
Stanley Kimmel, 6609 Independence Ave., Springfield, Va., and Milton L. Tepper, Franconia, Va. (118 Sharon Chapel Road, Alexandria, Va.)
Filed July 6, 1960, Ser. No. 41,202
10 Claims. (Cl. 143—6)

This invention relates to a cutting-guide table for use by the hobbyist or "Do It Yourself" woodworking enthusiast in conjunction with any one of the various well-known electrically driven power hand saws.

Previously known and readily available work tables or cutting-guide tables for the amateur or hobbyist woodworker who tinkers in his basement workshop are complicated and costly and require elaborate layouts while at the same time necessitate the permanent setting aside of valuable basement floor space. Further, such heretoknown tables are such that they cannot be readily and easily moved around, and they are of such construction that they cannot be said to be portable, in any sense of the word.

Attempts have been made by some to remedy this situation by providing what is commonly known as miter boxes or miter guides for such hand-operated power saws. Even such miter boxes or miter guides are also constructed in a complicated manner and are rather costly while at the same time being of such a nature that they are not capable of universal use, that is, for example, the number of different angular cuts that can be made in cutting thereby a piece of wood, viz. a 2 x 4 piece of wood, are limited by the very structure of the miter box or guide, and this phenomenon is brought by the lack of a means for accommodating the blade in combination with the other component elements thereof. In those instances where such heretofore available devices are so constructed that provision is made for enabling the cutting of the work stock at a number of various angles, the construction is so complicated and complex that the cost thereof is prohibitive to the amateur woodworker while at the same time there is not provided any means for preventing the damage of the work piece supporting means, viz. table top on which work piece is resting, that is, after the work piece has been cut at the desired angle, the blade cuts into the table top.

There has not heretofore been known and made available a portable, easily constructed, and economical cutting-guide table capable of universal utility when used in conjunction with one of the various well-known electrically driven portable hand power saws such as are commonly used by the amateur woodworker. The cutting-guide table of this invention is such that any angular cut can be easily and economically made by the amateur woodworker who possesses even a minimum of skill in practising his woodworking hobby. The cutting-guide table here provided includes a top portion having therein a clearance trench or guideway means across and for preferably the entire width of the top portion, a guide bar for simultaneously guiding the saw which usually includes a platform and holding the wood to be cut in its predetermined angular position, and a pivotally supported means on the top portion for setting said wood piece at the predetermined angular position on the table top portion, said means including a protractor and a squaring member secured thereto. The guideway or clearance trench provides a glide path for clearance of the blade and one of its wall portions is angled to accommodate the blade of the saw which can be angularly tilted, as at 45 degrees. The guide bar is movably positioned adjacent one of the edges of the clearance trench and preferably parallel thereto and not only provides a guide means against which the platform of the saw may be moved but also holds the wood to be cut firmly in position. The cutting-guide table of this invention is light and is easily portable and can be positioned on any flat surface, such as that of an ordinary table, for use and, after use, can be easily stored out of the way until needed. It can be easily and economically fabricated from any durable sheet material, such as sheet aluminum or sheet stainless steel, or from rod material in the form of a cage-like structure, as by brazing or welding, or soldering.

An object of this invention is to provide an easily and economically constructed, easily used, and easily storaged cutting-guide table for use in conjunction with any of the various well-known electrically driven power hand saws whereby a wood piece can be easily cut in any desired position and at any predetermined angle.

Another object of this invention is to provide an easily and economically constructed, easily used, and easily storaged cutting-guide table for use with any of the various well-known electrically driven power hand saws, such as those including a platform, said cutting-guide table including a means for simultaneously guiding the saw and holding the work piece to be cut in position.

Other objects and features of this invention will become readily apparent from the following detailed description which is illustrative of the preferred embodiments of this invention.

Like numerals designate similar component parts.

Figure 1:
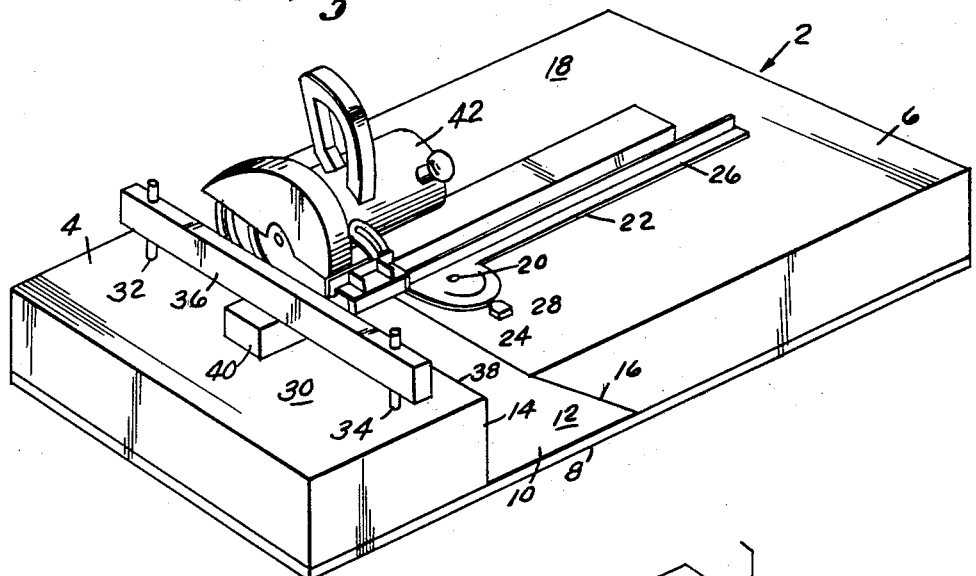
FIGURE 1 is a view in perspective of one embodiment of the cutting-guide table of this invention showing a power hand saw being used in conjunction therewith.

More specifically, there is provided the cutting-guide table 2 formed of members 4 and 6 each joined to flat member 8, as by commonly known joining means such as brazing, welding, or fasteners. Each of the members 4 and 6 and 8 are preferably formed by bending thin gauge material such as sheet aluminum and sheet stainless steel or even plastic sheet and assembled as clearly shown in the appended drawings to form the easily portable cutting-guide table 2 having the clearance trench or guideway 10 therein preferably for the width of said table 2. The portion 12 of flat member 8 forms the bottom wall of clearance trench 10; the side wall 14 of trench 10 is formed by the bent over portion of member 4 and is preferably substantially perpendicular to member 8 and portion 12 thereof, as is clearly shown in the appended drawings. The other side wall 16 of trench 10 is formed by the bent over portion of member 6 and is preferably inclined at an acute angle, viz. a 45 degree angle, to member 8 and portion 12 thereof as well as to the top surface 18 of member 6, as clearly shown in the appended drawings.

Pivotally mounted on top surface 18 of member 6, by means of a pivot member such as a rivet 20, is protractor and squaring member assembly 22 including protractor 24 and squaring member 26 secured thereto. Pivot member 20 passes both through member 8 at its top surface 18 and through protractor 24 which, of course, pivots thereabout. Also attached to member 8 at top surface 18 thereof is angle indicator member 28, as clearly shown in the appended drawings.

Figure 7:
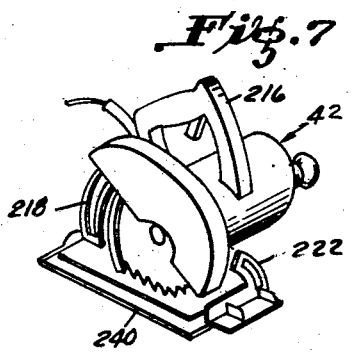
FIGURE 7 is a view in perspective of one type of electrically driven power hand saw which can be utilized in conjunction with the cutting-guide table of this invention.

Member 4 likewise has a top surface 30 which is on the same plane as is top surface 18 of member 6. Positioned on top surface 30 and attached thereto are spaced-apart post members 32 and 34 for adjustable and slidable positioning of the guide bar 36 thereon. The post members 32 and 34 are preferably so positioned that guide bar 36 is parallel at all times to the edge 38 of side wall 14. Thusly a work piece 40 to be cut is held in angular position by assembly 22 which includes protractor 24 and squaring member 26 and in fixed working position by guide bar 36 which also guides the platform 240 (FIGURE 7) of portable hand saw 42, as is clearly shown in the appended drawings.

Figure 3:
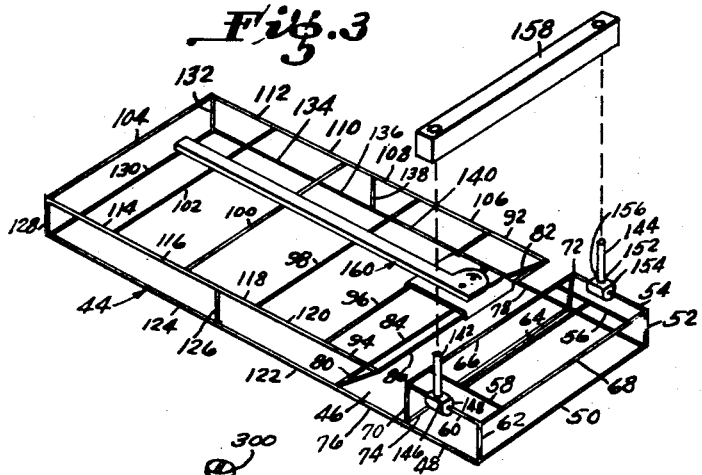
FIGURE 3 is a view in perspective of another embodiment of the cutting-guide table of this invention.
Figure 5:
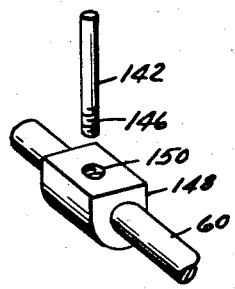
FIGURE 5 is a partially exploded view in perspective of another structural element utilized in the cutting-guide table shown in FIGURE 3.

Now referring to FIGURE 3 of the appended drawings, there is shown cutting-guide table 44 in the form of a cage-like structure of joined rod members, as by brazing, welding, or soldering. Said rod members may be cylindrically shaped and may be formed of metal, such as aluminum or steel, or of an organic plastic, such as nylon. Cutting-guide table 44 likewise has a clearance trench 46 shaped as is clearance trench 10 of cutting-guide table 2. Cutting-guide table 44 here shown is formed by joined rod members 48, 50, 52, 54, 56, 58, 60, 62, 64, 66, 68, 70, 72, 74, 76, 78, 80, 82, 84, 86, 92, 94, 96, 98, 100, 102, 104, 106, 108, 110, 112, 114, 116, 118, 120, 122, 124, 126, 128, 130, 132, 134, 136, 138, and 140.

Attached to cutting-guide table 44 at rod members 64 and 60 are post members 142 and 144, respectively, each being of similar construction. Post member 142 has a threaded end portion 146 to be threadedly received by sleeve member 148 in the tapped opening 150 therein. Likewise post member 144 has a threaded end portion 152 to be threadedly received by sleeve member 154 in the tapped opening 156 therein. The sleeve members 148 and 154 are slidably positioned on rod members 60 and 54, respectively, and the respective threaded end portions 146 and 152 are of such length that the post members 142 and 144 also act as set screws against the respective rod members 54 and 60 to prevent sliding movement of the respective sleeve members 148 and 154 on their respective rods 60 and 54, as is clearly shown in the appended drawings. The guide bar 158 is slidably and adjustably positioned on said post members 142 and 144.

Figure 4:
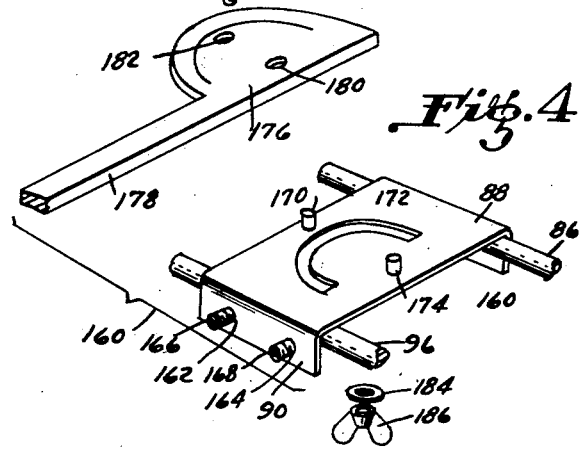
FIGURE 4 is an exploded view in perspective of structural elements utilized in the cutting-guide table shown in FIGURE 3.

The protractor and squaring member assembly 160 includes plate 88 (FIGURE 4) having flanges 90 and 161. Flange 161 is so formed as to envelope partially a portion of rod 86, and flange 90 has therethrough openings 162 and 164 to receive set screws 166 and 168. In positioning the assembly 160, the plate 88 is positioned with its flange 161 about rod 86 and flange 90 about rod 96, and set screws 166 and 168 are tightened to engage rod 96 thereby to hold assembly 160 in position. As is clearly shown in the appended drawings, rod members 86, 96, 98, 100, 102, and 104 are preferably parallel to each other.

Plate 88 has positioned and attached thereon the angle indicator 170 and a 180 degree slot 172 therethrough. Also positioned on and attached to plate 88 is the pivot pin 174 for the mounting of the assembly 160. The protractor 176 has secured thereto, and preferably integral therewith, the squaring member 178. Also, said protractor 176 has at the center point thereof the opening 180 for securing the pivot pin 174 and also the opening 182 to coincide with the slot 172 when the protractor is positioned on plate 88. Positioned through said opening 182 and slot 172 is preferably flat-head screw member 300 to receive the washer 184 and wingnut 186, thereby allowing the protractor and squaring member to be simultaneously pivoted about pin 174.

Thusly is there provided a cutting-guide table which enables the cutting of wood to a given length and angle, which is easily portable, which is rugged, which allows sawdust formed to be easily removed from the working surface, which gives an unobstructed view of the blade as it cuts, and which is inexpensive.

Figure 6:
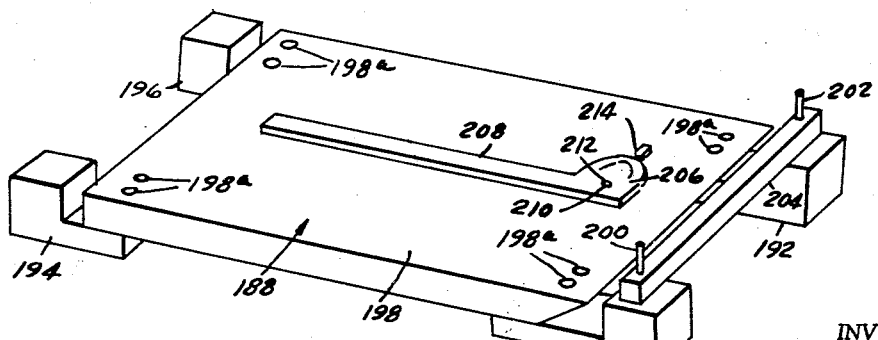
FIGURE 6 is a view in perspective of another embodiment of the cutting-guide table of this invention.

Likewise, a cutting-guide table 188 such as is shown in FIGURE 6 is within the scope of this invention. Said table 188 includes four support members 190, 192, 194, and 196 and the platform 198 therebetween. Platform 198 is removably secured to said support members 190, 192, 194 and 196 by means of fasteners 198a, which may be bolts or wood screws, as the case may require. Attached to support members 190 and 192 are the spaced-apart posts 200 and 202 to receive slidably the guide bar 204. Pivotally attached to platform 198 is the protractor 206 and squaring member 208 secured thereto, and the pivot pin 210 attached to platform 198 and passing through opening 212 in protractor 206 is the member about which the protractor and squaring member pivot. Also attached to platform 198 is angle indicator 214. This table 188, as is readily apparent, can be easily assembled and disassembled.

The electrically driven portable power hand saw 42 is one of the many various saws which is used in combination with the cutting-guide table of this invention. This saw 42 includes the handle 216, the platform 240, the slotted member 218 enabling the operator to raise or lower the blade 220 thereof, and the slotted member 222 enabling the operator to tilt angularly the blade thereof.

Figure 2:
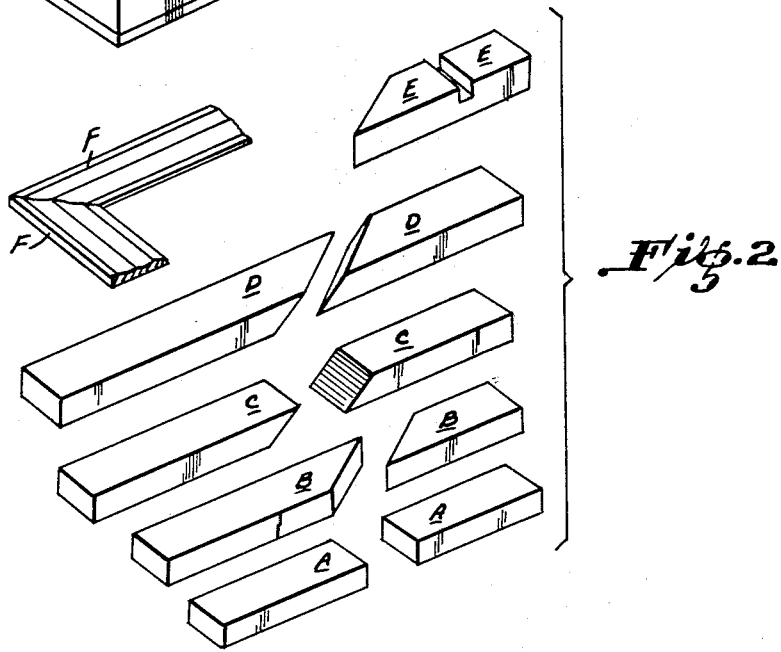
FIGURE 2 is a view in perspective of a plurality of cut work pieces showing the various types of angular cuts made possible by utilizing the cutting-guide table of this invention.

The various types of cuts which can be easily obtained using the cutting-guide table of this invention are shown in FIGURE 2. In using said table in conjunction with a power hand saw, the platform thereof is set against the guide bar, which, of course, acts as a guide for the saw throughout the cutting operation. The material to be cut rests on the top surface against the squaring member, across the guideway or clearance trench and under the guide bar which rests firmly on the material thereby holding it in place as well as guiding the saw. The guide bar adjusts to the height of the material being cut. The following table shows how the illustrated cuts are obtained.

| Type of Cut | Position of protractor-squaring member and saw | | | |
| --- | --- | --- | --- | --- |
| | Protractor-squaring member | | Saw | |
| | 90° to Guide Bar | 45° to Guide Bar | Blade 90° to Platform | Blade 45° to Platform |
| A | X | | X | |
| B | | X | X | |
| C | X | | | X |
| D | | X | | X |
| E | X | | X | |
| F | | X | X | |

For example, to cut D—D, the protractor-squaring member assembly is positioned at an angle 45° with respect to the guide bar, and the saw is angularly tilted so that its blade is 45° with respect to the platform of the saw. The dado cut E—E is made by adjusting the height of the blade of the saw. To make the cut F—F, two pieces of picture frame molding are placed back to back and one 45° cut is made thereby obtaining two sides of a perfect 90° picture frame.

In carrying out the cutting operation using the cutting-guide table of this invention, the protractor and squaring member assembly is positioned at the desired angle. The portion of the material at which the cut is to be made is positioned over the clearance trench, and the material is positioned against the squaring member and beneath the guide bar and on the top portion of the table. The saw platform is placed against the guide bar with the blade over the portion marked to be cut thereby. The saw is then moved through the mark where the cut is to be made, always keeping the platform positioned against the guide bar, thereby to obtain a uniform and precise cut.

Many alterations and changes may be made without departing from the spirit and scope of this invention which is set forth in the appended claims which are to be construed as broadly as possible in view of the prior art.

We claim:

1. A cutting-guide table comprising a top portion having a transverse guideway means therein for accommodating the blade of a portable power saw, transverse guide bar means parallel to said guideway means for simultaneously guiding the saw and holding the work piece to be cut in a predetermined fixed position, and pivotally supported means for setting and holding said work piece at said predetermined position on said table top portion, said means including a protractor and a squaring member secured thereto.

2. A cutting-guide table comprising a top portion having a transverse guideway means therein for accommodating the blade of a portable power saw, transverse guide bar means parallel to said guideway means for simultaneously guiding the saw and holding the work piece to be cut in a predetermined fixed position, said guide bar means including a bar member adjustably positioned at least along a plane perpendicular to said top portion, and pivotally supported means for setting and holding said work piece at said predetermined position on said table top portion, said means including a protractor and a squaring member secured thereto.

3. A cutting-guide table comprising a top portion having a transverse guideway means therein for accommodating the blade of a portable power saw, said guideway means being defined by two side walls and a bottom wall, at least one of said side walls forming substantially a 45 degree angle with said table top portion, transverse guide bar means parallel to said guideway means for simultaneously guiding the saw and holding the work piece to be cut in a predetermined fixed position, and pivotally supported means for setting and holding said work piece at said predetermined position on said table top portion, said means including a protractor and a squaring member secured thereto.

4. A cutting-guide table comprising a top portion having a transverse guideway means therein for accommodating the blade of a portable power saw, transverse guide bar means parallel to said guideway means for simultaneously guiding the saw and holding the work piece to be cut in a predetermined fixed position, said guide bar means including a bar member adjustably positioned at least along a plane perpendicular to said top portion, said guideway means being defined by two side walls and a bottom wall, and pivotally supported means for setting and holding said work piece at said predetermined position on said table top portion, said means including a protractor and a squaring member secured thereto.

5. A cutting-guide table comprising a top portion having a transverse guideway means therein for accommodating the blade of a portable power saw, transverse guide bar means parallel to said guideway means for simultaneously guiding the saw and holding the work piece to be cut in a predetermined fixed position, said guide bar means including a bar member adjustably positioned both along a plane perpendicular and a plane parallel to said table top portion, and pivotally supported means for setting and holding said work piece at said predetermined position on said table top portion, said means including a protractor and a squaring member secured thereto.

6. A cutting-guide table comprising a top portion having a transverse guideway means therein for accommodating the blade of a portable power saw, transverse guide bar means parallel to said guideway means for simultaneously guiding the saw and holding the work piece to be cut in a predetermined fixed position, means for supporting said guide bar means on said table top portion, and pivotally supported means for setting and holding said work piece at said predetermined position on said table top portion, said means including a protractor and a squaring member secured thereto.

7. A cutting-guide table comprising a top portion having a transverse guideway means therein for accommodating the blade of a portable power saw, at least said top portion of said table being a cage-like structure comprising a plurality of spaced-apart rod members, transverse guide bar means parallel to said guideway means for simultaneously guiding the saw and holding the work piece to be cut in a predetermined fixed position, and pivotally supported means for setting and holding said work piece at said predetermined position on said table top portion, said means including a protractor and a squaring member secured thereto.

8. A cutting-guide table comprising a top portion having a transverse guideway means therein for accommodating the blade of a portable power saw, transverse guide bar means parallel to said guideway means for simultaneously guiding the saw and holding the work piece to to cut in a predetermined fixed position, and means for setting and holding said work piece at said predetermined position on said table top portion.

9. A cutting-guide table comprising a top portion having a transverse guideway means therein for accommodating the blade of a portable power saw, at least said top portion of said table being a cage-like structure comprising spaced-apart rod members, transverse guide bar means parallel to said guideway means for simultaneously guiding the saw and holding the work piece to be cut in a predetermined fixed position, and means for setting and holding said work piece at said predetermined position on said table top portion.

10. A cutting-guide table comprising a top portion having a transverse guideway means therein for accommodating the blade of a portable power saw, at least said top portion of said table being a cage-like structure comprising a plurality of spaced-apart rod members, transverse guide bar means parallel to said guideway means for simultaneously guiding the saw and holding the work piece to be cut in a predetermined fixed position, pivotally supported means for setting and holding said work piece at said predetermined position on said table top portion, and means for adjustably positioning said pivotally supported means on said table top portion.

References Cited in the file of this patent

UNITED STATES PATENTS

| | | |
|---|---|---|
| 2,310,813 | Sellmeyer | Feb. 9, 1943 |
| 2,595,322 | Avery | May 6, 1952 |
| 2,601,878 | Anderson | July 1, 1952 |
| 2,682,899 | Miller | July 6, 1954 |
| 2,785,708 | Krogen | Mar. 19, 1957 |
| 2,818,892 | Price | Jan. 7, 1958 |

FOREIGN PATENTS

| | | |
|---|---|---|
| 783,112 | Great Britain | Sept. 18, 1957 |